Oct. 24, 1972  F. MONAGHAN  3,700,529
METHOD AND APPARATUS FOR TUBULAR ARTICLES
Filed Oct. 27, 1970  3 Sheets-Sheet 1
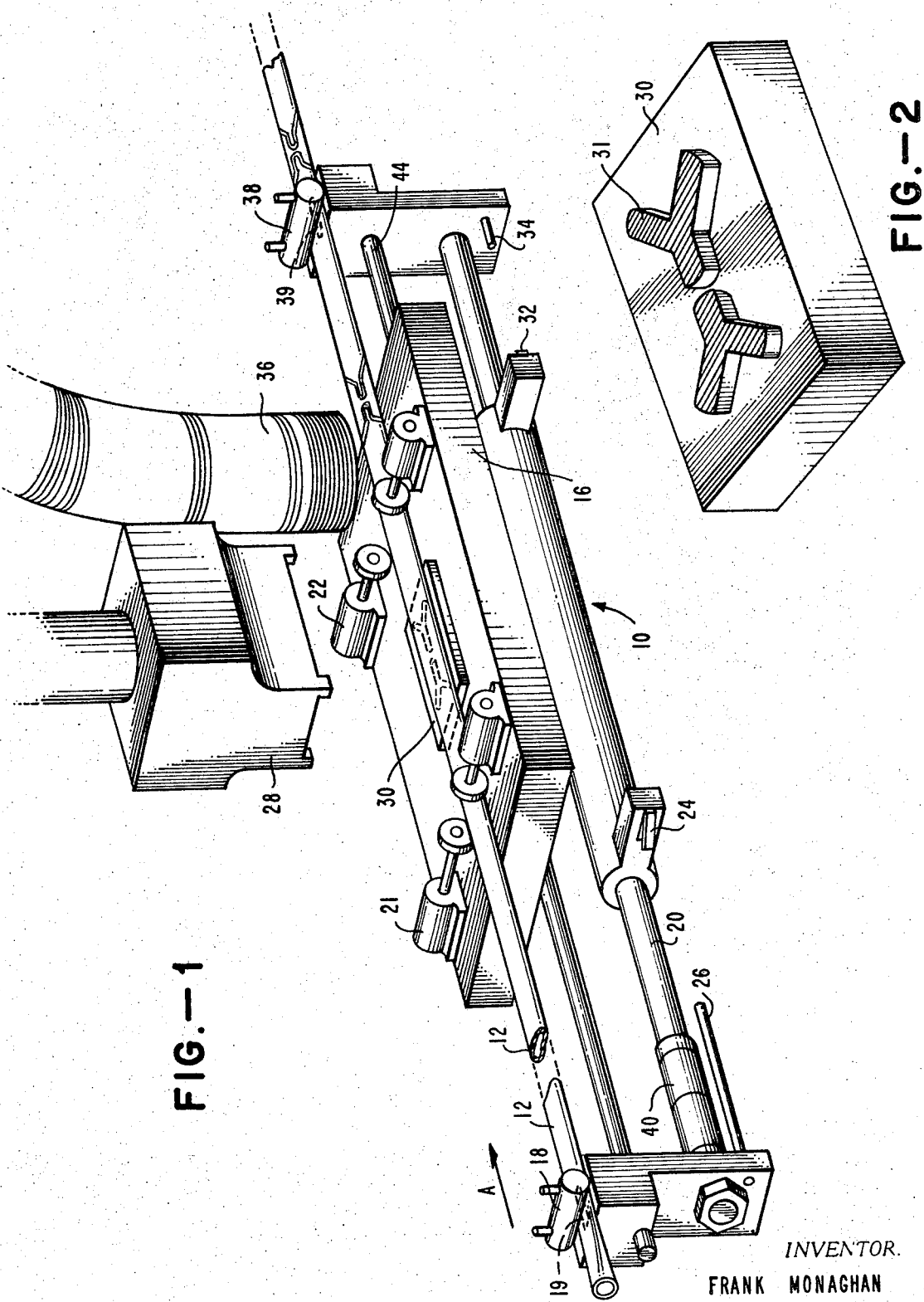
FIG.—1
FIG.—2
INVENTOR.
FRANK MONAGHAN
BY
*Sanford Astor*
ATTORNEY Oct. 24, 1972     F. MONAGHAN     3,700,529
METHOD AND APPARATUS FOR TUBULAR ARTICLES
Filed Oct. 27, 1970     3 Sheets-Sheet 2
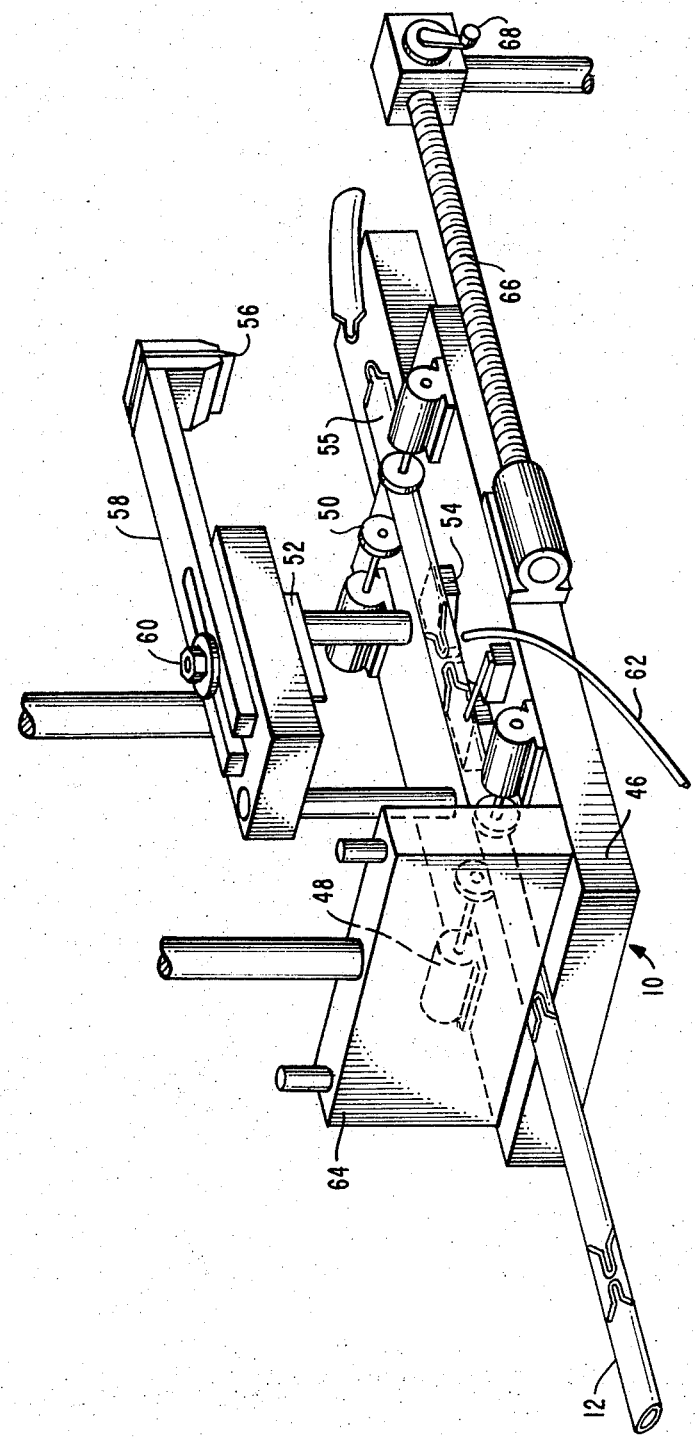
FIG.—3
INVENTOR.
FRANK MONAGHAN
BY
ATTORNEY

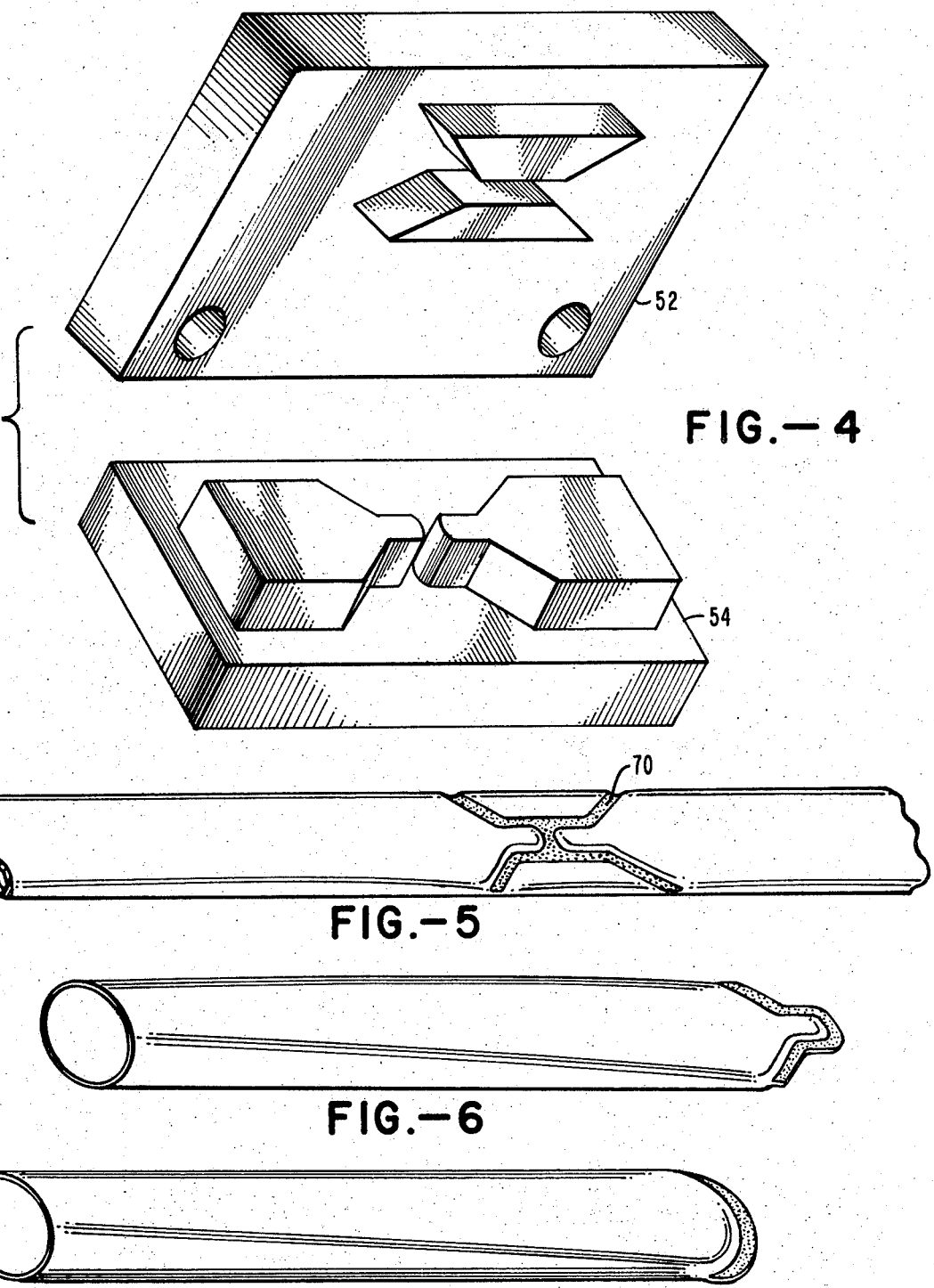

United States Patent Office 3,700,529
Patented Oct. 24, 1972

3,700,529
METHOD AND APPARATUS FOR TUBULAR ARTICLES
Frank Monaghan, Glendale, Calif., assignor to M & H Plastics, Inc.
Filed Oct. 27, 1970, Ser. No. 84,362
Int. Cl. B32b 31/00, 15/34
U.S. Cl. 156—510   6 Claims

ABSTRACT OF THE DISCLOSURE

This invention relates to a tube sealing and cut-off machine comprising a machine adapted to take extruded plastic tubing and, by a reciprocating continuous feed, concurrently cutting off sections of the tubing by spaced operable knives and trimming dies and sealing end portions of said tubing by a sealing die.

BACKGROUND OF THE INVENTION

In the continuous production of hollow tubular articles such as plastic tubing the plastic tubing is extruded and is then cut into lengths and fed, a piece at a time, through a series of dies to create the article desired. These pieces are fed by hand into the cutting machine.

It has also been found necessary to maintain an internal pressure inside of the hollow tubing in order to properly cut and form the articles. Often these articles have had to be created in a non-continuous process creating a time consuming and expensive method of feeding the pieces of tubing into a forming machine.

SUMMARY OF THE INVENTION

Accordingly it is an object of the present invention to provide a novel hollow tube sealing and cut-off machine capable of continuously forming hollow tubular articles and continuously cutting off desired lengths of said tubing in order to create hollow tubular articles.

Another object of this invention is to provide a novel tube forming and cut-off machine comprising a means for introducing a continuous extruded plastic tubing to said machine, dies for concurrently forming and sealing portions of said tubing to form hollow tubular articles and operable cut-off knives disposed to cut off sections of said tubing to create said hollow tubular articles.

BRIEF DESCRIPTION OF THE DRAWINGS

FIG. 1 is a perspective view of the die sealing portion of the machine of the present invention.

FIG. 2 is a perspective view of the lower sealing die of the present invention.

FIG. 3 is a perspective view of the trimming portion of the machine of the present invention.

FIG. 4 is a detailed perspective view of the top and bottom portions of the trimming die of the present invention.

FIG. 5 is a side elevation view of the hollow tubing of the present invention after the sealing die has been applied.

FIG. 6 is a side elevation view of the finished hollow tubular article of the present invention.

FIG. 7 is a side elevation veiw of another finished hollow tubular article of the present invention.

DESCRIPTION OF THE PREFERRED EMBODIMENTS

As shown in FIG. 1 and FIG. 2 the present invention includes the first stage section of a machine 10. Hollow plastic tubing 12 is fed to machine 10 directly from a hollow plastic tubing extruding machine not shown but which is one of many well known in the art.

The tubing produced by the extrusion machine progresses in the direction of an arrow A onto table 16. Tubing 12 is guided into position on table 16 by a vacuum guide comprising a weight 18 disposed over a vacuum opening 19. An additional vacuum guide is provided at the exit end of the first stage of the machine comprising weight 38 disposed over vacuum opening 39.

In the first cycle in the operation of machine 10, rod 20 moves to its forward position, in the direction of arrow A, and vacuum guides 18, 19 and 38, 39 are closed. This carries tubing 12 forward to put it in position for the die sealing operation.

In the second cycle the tubing 12 is gripped by two pairs of spaced apart tube holding fixtures 21 and 22.

At this point as shown in FIG. 1 upper movable die member 28 closes upon the lower stationary die portion 30 which is mounted on table 16, and shown in more detail in FIG. 2, to seal hollow plastic tubing 12 in a desired shape for the article manufactured. Stationary die member 30 is provided with a raised portion 31 in a Y shape disposed in opposition to a similar raised portion in movable die 28 to seal tube 12 when they close together. Die 28 and 30 may be any die which is well known in the art for sealing plastic tubing however for preferable results, a sonic sealing die is utilized, such as one manufactured by Ultra-Sonic Corporation.

When rod 20 reaches the forward or die sealing position recycle switch 32 is activated by a recycle trigger 34 and after the die 28, 30 has closed and reopened rod 20 is activated to the rear, opposite to arrow A. As rod 20 is about to recycle to the rear, vacuum guides 18, 19 and 38, 39 open, that is the weights 18 and 38 raise, so that the tubing 12 is not pulled back by rod 20. At the same time tube holding fixtures 21 and 22 remain closed holding tubing 12 in position.

When rod 20 reaches its rearward position a return cycle switch 24 is activated by return cycle trigger 26 causing vacuum fixtures 18, 19 and 38, 39 to close, tube holding fixtures 21 and 22 to open and sending rod 20 forward again as in the first cycle.

A cooling duct 36 is provided to cool the sonic sealing operation of hollow plastic tubing 12. A sizing spacer 40 is provided on rod 20 in order to size the length of the tubing desired between two successive die sealing operations of the continuous plastic tubing 12. By adding additional spacers or removing spacers the exact length of tubing between successive sealing operations may be controlled by the operator.

Table 16 is fixed above guide rod 44.

It will be understood that the raised portion of dies 28 and 30 may be provided with any suitable configuration depending upon the shape desired at the sealed ends of the plastic articles being created.

Referring now to FIG. 3 there is shown the second portion of machine 10 into which hollow plastic tubing 12 is fed after the sealing operation has been performed as previously described.

Hollow plastic tubing 12 is fed onto table 46 of machine 10 where it is gripped by tube holding fixtures 48 and 50. When the hollow plastic tube 12 is held in place by guides 48 and 50 the sealed portions that were sealed by die 28, 30 in the first portion of the operation are centered on a trimming die consisting of an upper movable blade portion 52 and a lower stationary die portion 54 disposed in opposition to movable portion 52. Trimming die portions 52 and 54 close, trimming the plastic tubing around the seals and in effect creating two of the individual finished plastic articles sealed at both ends, as can be seen at tube portion 55.

At the same time that die 52 and 54 close, a knife 56, which is fixedly attached to an adjustable ram 58 by a bolt 60, is so positioned so that it cuts the hollow plastic tubing portion 55 midway between two sealed ends, as sealed by the initial portions of the operation, creating a hollow plastic article which is sealed at one end and open at the other end. An air blast is necessary to move the loose cut hollow tubing from the area of the trimming die and knife and is provided by a air pressure tube 62.

In order to hold the hollow plastic tubing 12 firmly in place during the trimming and cutting operation a clamp 64 drops onto the plastic tubing 12 just prior to the die 52, 54 closing so that the hollow plastic tubing 12 is held firmly in place during the trimming and cutting operation.

In addition, clamp 64 holds plastic tubing 12 firmly in place so that the reciprocating motion of rod 20 in the first phase of the operation does not pull hollow plastic tubing 12 back out of position. Table 46 is adjustable by threaded adjusting screw 66 operated by crank handle 68. Thus the size of particular hollow plastic tube article that is desired may be adjusted by the movement of adjustment screw 66 and the adjustment of knife 56.

Referring now to FIG. 4 there is shown a detailed drawing of the trimming die consisting of the movable upper portion 52 and the stationary lower portion 54. Closing of this die trims away the excess portion between the two seals created in the first stage of the operation.

FIG. 5 shows the hollow plastic tubing of the present invention in the stage after the sealing die has been applied creating a seal 70 in the hollow plastic tubing in accordance with the configuration desired. Obviously any configuration which may be required for the particular article to be made can be accomplished by simply changing the shape of the die.

FIG. 6 shows the finished hollow plastic tubing of the present invention after the trimming die has trimmed the excess portion away from the seal created in the first portion of the operation and the knife has cut the tubing into two sections.

FIG. 7 shows the hollow plastic tubing of the present invention in which a seal of a different shape creating a half moon sealed end to the plastic tubing is used.

As has been described above in the operation of the machine of the present invention the hollow plastic tubing does not move forward in a completely continuous manner but moves forward until it is stopped by the holding devices as described above so that the dies as described in both portions of the operation may close simultaneously and perform the operations as described. The two portions of the machine operate in conjunction so that the sealing die and trimming die close at the same time while the plastic tubing is stationary. Both dies then open and the reciprocating rod 20 of the first portion of the operation moves in a direction opposite to Arrow A to its rear position. Holding fixtures then grip the hollow plastic tubing and on the forward motion of rod 20 the hollow plastic tubing is carried forward to its new position for another die operation. During the forward motion of table 16, that is in the direction of Arrow A, clamp 64 is in its raised position so that the hollow plastic tubing may be moved in a forward direction. After the forward motion of table 16 stops, clamp 64 drops into position holding the hollow plastic tubing firmly so that the die operations may take place. Clamp 64 remains in a closed position during the reciprocal motion of rod 20 and then raises so that the forward motion of rod 20 carries the hollow plastic tubing forward to its new position.

Since the hollowe plastic tubing is quite pliable the hollow plastic tubing may be fed to the machine of the present invention directly from a known extruder without difficulty since during the time that the hollow plastic tubing is stopped the continuous feed from the extruder simply bends the hollow plastic tubing and does not effect the operation of the present machine. The forward motion of the machine of the present invention then takes up the slack that has built up while it was stopped. The machine movement operates quickly enough and in perfect precision with the means from which the hollow plastic tubing is fed such as from an extruder so that the die and cutting operations are performed at the speed that the plastic tubing is being fed from the extruder thus making it a continuous operation.

The timing mechanisms used to operate the machine of the present invention are electronically controlled by solenoids or other electronic methods which are well known in the art and which are not shown. The movement of rod 20 and the movement of the dies of the present invention may be operated by any convenient method known in the art such as air pressure or hydraulic pressure.

It will be obvious to those skilled in the art that various modifications of the present invention may be resorted to in a manner limited only by a just interpretation of the following claims:

I claim:
1. A machine for sealing and cutting hollow, tubular, plastic tubing, fed from a continuous extruder, in order to form hollow tubular plastic articles comprising:
   (a) a reciprocating rod for feeding a continuous flow of hollow tubing to said machine;
   (b) vacuum guides for holding said tubing during the feeding stage;
   (c) a tube sealer to seal the tube closed at spaced intervals;
   (d) a trimmer to cut away the hollow tubing between two seals;
   (e) a knife to cut the tubing into two parts between adjacent seals creating a hollow tubular article sealed on one end and open on the other.
2. The machine of claim 1 wherein said tube sealer is a sonic sealer.
3. The machine of claim 1 wherein said trimmer is a trimming die.
4. The machine of claim 1 comprising tube holding fixtures to hold said tubing during the sealing and trimming operations.
5. The machine of claim 1 comprising adjustment spacers to control the size of hollow tubular articles created.
6. The machine of claim 1 comprising electronic means for controlling the timing of the feeding, sealing and trimming operations.

References Cited
UNITED STATES PATENTS

| | | | |
|---|---|---|---|
| 2,918,106 | 12/1959 | Fewer | 156—583 |
| 2,884,988 | 5/1959 | D'Angelo | 156—510 |
| 3,562,041 | 2/1971 | Robertson | 156—580 |
| 2,698,046 | 12/1954 | Finke | 156—510 |
| 3,148,598 | 9/1964 | Davis | 156—515 |
| 3,548,723 | 12/1970 | Sengewald | 156—510 |

DOUGLAS J. DRUMMOND, Primary Examiner

U.S. Cl. X.R.

156—580, 583